Aug. 16, 1927.
G. P. LUCKEY
1,639,229
LATITUDE INDICATOR FOR AIRCRAFT
Filed May 8, 1924
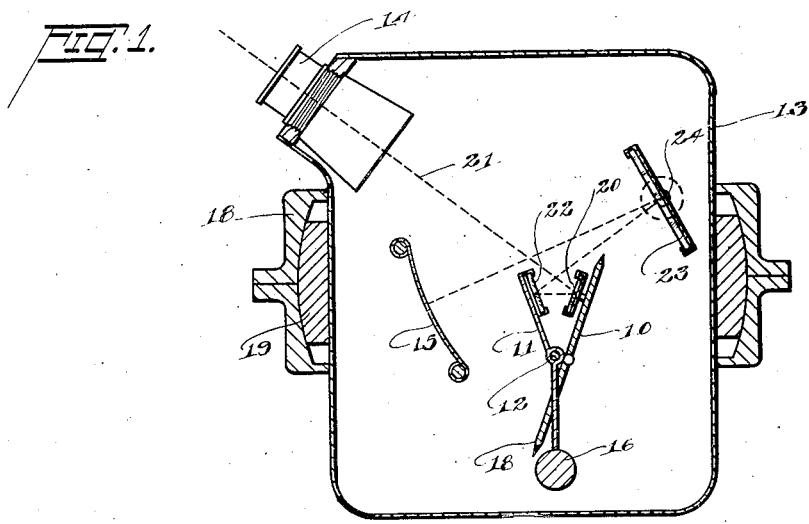
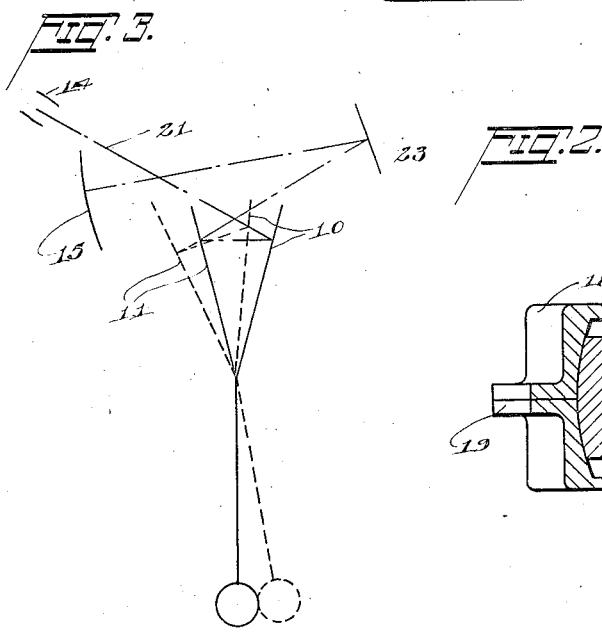
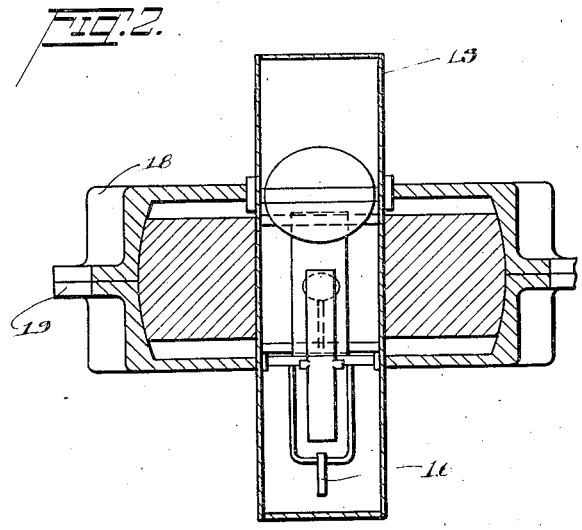
INVENTOR
George P. Luckey
BY Robert H. Young
ATTORNEY Patented Aug. 16, 1927.

1,639,229

UNITED STATES PATENT OFFICE.

GEORGE P. LUCKEY, OF DAYTON, OHIO.

LATITUDE INDICATOR FOR AIRCRAFT.

Application filed May 8, 1924. Serial No. 711,937.

This invention relates to a latitude indicator for aircraft, and has for its principal object the provision of an instrument of this character utilizing a magnetic needle the dip of which is measured to determine latitude.

The instrument comprises a pendulous member serving as a reference which always assumes a vertical position, and a magnetic needle, the angularity of which with respect to the pendulous member due to the earth's attraction of a pole-seeking end, is measured through an optical system which magnifies any slight divergence so that the latitude can be determined accurately.

In the course of the following detailed description, reference is made to the accompanying drawing illustrating the invention, in which:

Fig. 1 is a central vertical section through an instrument constructed in accordance with the invention.

Fig. 2 is a transverse section showing the elements of the instrument in end elevation, and Fig. 3 is a diagrammatic view to illustrate the optical principle utilized in the instrument.

Throughout the views the same reference numerals are applied to the same parts.

The instrument of the present invention comprises a magnetic needle 10 and a pendulous member 11 pivoted preferably on a common spindle 12 inside a casing 13. The casing 13 is fitted with a telescope sight 14 focused on a scale 15 calibrated in degrees of latitude, and may be filled with a suitable transparent liquid to dampen the movements of the parts 10 and 11. The image seen in the telescope, as will hereinafter appear, will vary in accordance with any change in divergence between the magnetic needle and the pendulous member. The latter always occupies a true vertical position due to the pendulum weight or bob 16, while the magnetic needle has its pole-seeking end 17 assuming different dips according to the location in latitude. The slightest degree of divergence is magnified through the optical system shown and to be presently described in detail.

The casing 13 is mounted in a swivel bearing ring 18 of any suitable type which enables the revolving of the casing into a north and south position so that the true dip of the magnetic needle 10 may be secured. A spherical faced bearing 19 on the casing permits the vertical positioning of the casing. That is, there will be no appreciable lateral inclination which might introduce an element of error in the computation due to the needle and the pendulum not being in a vertical plane. The inclination of the casing as a whole, fore and aft in the vertical plane, does not affect in any way, the accuracy of the computation of latitude due to the optical system incorporated in the instrument. It is assumed however, that a computation will be made only when the plane is flying on a straightaway with the plane practically horizontal or nearly so. The universal mount of the casing permits positioning the same tolerably accurately, and if desired, one or more levels may be provided on the casing to assist in properly positioning the same when a measurement of latitude is to be made. It is assumed the pilot will be provided with a compass which will assist him in placing the instrument approximately in a north and south plane.

The needle 10 supports a small mirror or other reflector 20 which reflects a beam of light or the line of sight 21 passing through the telescope 14 through cross hairs therein or peep holes, whichever are provided. The beam 21 is reflected upon or from a mirror 22 supported on the pendulum 11 facing the mirror 20. This in turn reflects the beam to or from a mirror 23 adjustable in trunnions 24 in the side walls of the casing 13. The adjustability is provided for a purpose which will presently appear. The mirror 23 in turn reflects the beam upon or from the scale 15. The latter is calibrated in rather large units of degrees latitude, and in a sensitive instrument, such as that herein contemplated, may have a range of about four hundred miles, or some other suitable range. In the back and forth reflection, a slight degree of divergence of the needle with respect to the pendulum is greatly magnified so that close measurement of latitude can be made. It is noted that the telescope 14 is set in an opening 25 in the casing to permit entry of light. The same result may be secured by the provision of a window in the casing walls.

The mirrors 20 and 22 have their reflecting surfaces lying in planes intersecting at the common pivot point 12 and it is by virtue of this arrangement that a given divergence between the needle 10 and pendulum 11 can be read alike in various positions of the telescope 14 in a north and south vertical plane within the limits of the instrument. This is in accordance with optical laws. It will be noted in Fig. 3 that the same reading on the scale 15 is secured in two positions of the telescope 14 relative to the needle 10 and pendulum 11. In this case, for the purpose of simplicity, the needle 10 and pendulum 11 are shown revolved together to the dotted line position so as to reproduce the situation that obtains when the telescope 14 moves with the casing 13 relative to the needle 10 and pendulum 11 due to rising and falling of the plane and uneven flight generally at the time the latitude measurement is made. It is noted in Fig. 3 that the dotted lines representing the rays in the revolved position of the pendulum and needle terminate at precisely the same point on the scale 15 as the full line rays.

The instrument may be used for measuring latitude in a given position of the mirror 23 within the limits of the scale 15. After the plane has flown a distance so that the dip of the needle 10 is changed appreciably, the line of sight reflected back and forth runs off the scale and it is necessary to recalibrate the instrument. This is done by setting the mirror 23 so that the center of the scale is secured as an image. The pilot then uses the instrument to correct previous readings of latitude and can proceed indefinitely with repeated settings of the instrument. If a stationary mirror were used, and it were desired to avoid resetting the instrument, a correspondingly longer scale would have to be provided, or the magnification secured by the back and forth reflection or the magnification of the telescope would have to be decreased for a given length of scale calibrated in smaller units.

I claim:

1. In a magnetic dip indicator, a support an established vertical and a magnetic needle mounted on said support, means to indicate the divergence between the needle and the vertical, and a universal mounting for said support.

2. An inclination indicator comprising a reference member always maintaining a certain position, a magnetic member in juxtaposition therewith, mounted upon a horizontal axis and subject to varying inclination, and a system of reflectors to indicate by a beam of light the divergence between said members.

3. In a portable magnetic dip indicator, an established reference, a magnetic vane adjacent thereto, means mounting said reference and vane for relative movement due to the change in the magnetic dip angle, and indicating means magnifying a slight divergence between the vane and the reference for measurment.

4. In a magnetic dip indicator, an established reference, a magnetic vane means for mounting said reference and vane so that they remain an equal distance apart in a vertical plane except when actuated by a magnetic force, and an optical system for magnifying the divergence between said needle and reference for measurement.

5. In a magnetic dip indicator, an established reference, a magnetic vane means for mounting said reference and magnetic vane for relative movement due to the change in the magnetic dip angle, a calibrated scale, a telescope focused on said scale, and mirrors arranged to reflect a beam from the telescope to the vane, to the reference, and then to the scale.

6. An inclination indicator comprising a reference member always maintaining a certain relative position, a magnetic member subject to varying inclination means for mounting said members for relative movement due to magnetic forces, and reflectors arranged to magnify slight degrees of divergence between said members for measurement.

7. An indicating instrument comprising a casing, a pendulous member pivoted therein, a dipping member pivoted at the same point with said pendulous member, and reflectors on each of said members having their reflecting surfaces in planes intersecting at said pivot point.

8. An indicating instrument comprising a casing, a pendulous member pivoted therein, a dipping member pivoted at the same point with said pendulous member, reflectors on each of said members having their reflecting surfaces in planes intersecting at said pivot point, a scale, and a third reflector to reflect a beam from the other reflectors to said scale.

9. An indicating instrument comprising a casing, a pendulous member pivoted therein, a dipping member pivoted at the same point with said pendulous member, reflectors on each of said members having their reflecting surfaces in planes intersecting at said pivot point, a scale, a third reflector to reflect a beam from the other reflectors to said scale, and a telescope sight focused on said scale.

10. An indicating instrument comprising a casing, a pendulous member pivoted therein, a dipping member pivoted at the same point with said pendulous member, reflectors on each of said members having their reflecting surfaces in planes intersecting at said pivot point, a scale onto which a beam from said reflectors is reflected, and a telescope sight focused on said scale.

11. An indicating instrument comprising a casing, a pendulous member pivoted therein, a dipping member pivoted at the same point, with said pendulous member, reflectors on each of said members having their reflecting surfaces in planes intersecting at said pivot point, a scale, a sight directed at one of said above-mentioned reflectors, and a third reflector for reflecting the scale on the other of said first-mentioned reflectors.

12. An indicating instrument comprising a casing, a pendulous member pivoted therein, a dipping member pivoted at the same point with said pendulous member, reflectors on each of said members having their reflecting surfaces in planes intersecting at said pivot point, a scale, a sight directed at one of said above-mentioned reflectors, and a third reflector for reflecting the scale on the other of said first-mentioned reflectors adjustable to secure an image of said scale visible in said sight in various degrees of dip of said dipping member.

13. An indicating instrument comprising a casing, a reference member, a member arranged to assume various degrees of divergence with respect to said reference member, means for mounting said members for synchronous movement a system of reflectors on said members for indicating the divergence between said members at all times.

14. An indicating instrument comprising a casing, a sight thereon, a reference member, a member arranged to assume various degrees of divergence with respect to said reference member, means for mounting said members for synchronous movement a scale, and a system of reflectors for indicating on said scale the divergence between said members.

15. In an indicating instrument, a casing, a pendulous reference member suspended inside said casing, an indicating member sensitive to an external force, means for mounting said members whereby the same relative angular relations will always be maintained, and a system of reflectors for indicating the divergence between said members when said sensitive member is actuated by the external force.

16. In an indicating instrument, a casing having a sight thereon, a pendulous reference member means for suspending said member inside said casing, an indicating member means for pivoting said indicating member on a substantially horizontal axis to assume different angular relations with respect to said pendulous member, a scale, and a system of reflectors for indicating on said scale the divergence between said members.

17. In a dip indicator, a casing, a pendulous vertical reference swingable in a vertical plane, a dipping member also movable in a vertical plane relative to said reference, and means comprising reflectors for indicating the divergence between said reference and said member.

18. In a dip indicator, a casing, a pendulous vertical reference therein swingable in a vertical plane, a dipping member also movable in a vertical plane relative to said reference, a scale within said casing, means for indicating on said scale the divergence between said reference and said member, and a sight on said casing thru which said scale may be read.

19. An aeronautical latitude indicating device comprising a casing a gravity plumb member, a dipping magnetic needle, means for mounting the plumb member and needle for relative movement within said casing and means to measure the divergence between said needle and member for determining latitude said last named means comprising a scale co-acting with said needle and plumb member and a sighting aperture in said casing for viewing said scale.

20. An aeronautical latitude indicating device comprising a gravity plumb member, a dipping magnetic needle, and mirrors on each of said members whereby the divergence therebetween may be measured by the divergence of a light beam reflected between said mirrors.

21. An aeronautical latitude indicating device comprising a casing, a laterally extending support therein, a pendulum swingable thereon, a magnetic needle pivoted at said support to make angles with said pendulum depending on the latitude, means for movably mounting said casing and means to measure the angle between said pendulum and needle to determine latitude.

In testimony whereof I affix my signature.

GEORGE P. LUCKEY.